(12) United States Patent
Schut

(10) Patent No.: US 6,281,269 B1
(45) Date of Patent: Aug. 28, 2001

(54) FLUID SET FOR INK-JET PRINTERS

(75) Inventor: David M. Schut, Philomath, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/492,255

(22) Filed: Jan. 27, 2000

(51) Int. Cl.$^7$ .......................... C09D 11/02; C09D 11/14; G01D 15/20
(52) U.S. Cl. .......................... 523/160; 106/31.6; 347/100
(58) Field of Search .................. 523/160, 161; 106/31.36, 31.37, 31.38, 31.29, 31.28, 31.6; 347/100

(56) References Cited

U.S. PATENT DOCUMENTS

| | | | |
|---|---|---|---|
| 4,398,915 | * | 8/1983 | Panto et al. ............................. 8/543 |
| 4,836,851 | * | 6/1989 | Pawlowski et al. ............... 106/31.58 |
| 4,966,607 | * | 10/1990 | Shinoki et al. ........................... 8/549 |
| 5,102,459 | * | 4/1992 | Ritter et al. ....................... 106/31.36 |
| 5,108,505 | * | 4/1992 | Moffatt ............................... 106/31.36 |
| 5,181,045 | * | 1/1993 | Shields et al. .......................... 347/43 |
| 5,428,383 | * | 6/1995 | Shields et al. .......................... 347/96 |
| 5,549,740 | | 8/1996 | Takahashi et al. ................. 106/20 R |
| 5,624,484 | | 4/1997 | Takahashi et al. ................. 106/31.75 |
| 5,679,143 | * | 10/1997 | Looman ............................. 106/31.43 |
| 5,695,820 | * | 12/1997 | Davis et al. .......................... 427/261 |
| 5,713,991 | * | 2/1998 | Kimura ............................. 106/31.39 |
| 5,766,267 | * | 6/1998 | Schmacher et al. ...................... 8/532 |
| 5,772,745 | | 6/1998 | Gregory et al. ................... 106/31.48 |
| 5,976,230 | * | 11/1999 | Askeland et al. .................. 106/31.27 |
| 6,056,811 | * | 5/2000 | Shimomura et al. ............. 106/31.36 |
| 6,080,229 | * | 6/2000 | Watanabe et al. ................. 106/31.43 |

FOREIGN PATENT DOCUMENTS

0899310A1   3/1999   (EP) .

* cited by examiner

Primary Examiner—Vasu Jagannathan
Assistant Examiner—Callie E. Shosho
(74) Attorney, Agent, or Firm—Michael D. Jones

(57) ABSTRACT

The present invention relates to dyes, and more particularly, waterfast ink-jet ink compositions containing the same. The dyes of this invention, when interacted with a second reactive fluid or 5$^{th}$ pen fluid, provides permanence benefits, such as smearfastness, smudgefastness, and waterfastness.

20 Claims, No Drawings

FLUID SET FOR INK-JET PRINTERS

FIELD OF INVENTION

The present invention generally relates to dyes, and more particularly, waterfast ink-jet ink compositions containing the same. The dyes of this invention, when interacted with a second reactive fluid, provides permanence benefits, such as: smearfastness, smudgefastness, and waterfastness.

BACKGROUND OF THE INVENTION

The use of ink-jet printing systems has grown dramatically in recent years. This growth may be attributed to substantial improvements in print resolution and overall print quality, coupled with appreciable reduction in cost. Today's ink-jet printers offer acceptable print quality for many industrial, commercial, business and residential applications at costs fully an order of magnitude lower than comparable products available just a few years ago. Notwithstanding their recent success, intensive research and development efforts continue toward improving the permanence issues of ink-jet images.

DETAILED DESCRIPTION OF THE INVENTION

Definitions

Fluid—includes either or both the reactant fluid and ink compositions.

Reaction—means that the solubility or phase state of one or more components is changed as to immobilize the movement of at least one colorant on the print medium in the event that one fluid comes in contact with another fluid and interacts.

Reactant Fluid—also known as a $5^{th}$ pen fluid or fixer fluid. A fluid that is typically substantially devoid of color (i.e., the reactant fluid may contain no colorant (e.g., dye or pigment), or it may contain a colorant that does not absorb visible light but may absorb in either or both the IR or UV spectrums). The reactant fluid comprises a component (a molecule or complex, or a functional group in a molecule or complex) that is reactive with a component (a molecule or complex, or a functional group in a molecule or complex), including the colorant, in an ink thus providing for enhanced image integrity of printed areas created with the ink, such as, increased permanent (e.g. waterfastness, smearfastness, etc.) or bleed alleviation; improved color vibrancy, improved edge acuity, or reduced dry time; in the event that the reactant fluid and the ink are printed at least partially on a same pre-determined area on a print medium, or on pre-determined areas adjacent one another on a print medium. The reactive fluid is reactive with at least one ink formulated according to the present invention.

Ink—a fluid containing at least one colorant, the ink absorbing in one or more regions (e.g., visible, IR, UV, etc.). Ink-jet printers typically contain an ink set with black, magenta, cyan, and yellow inks, commonly known as a 4-pen ink set. Additional pens with additional color inks may also be present.

In the remainder of the disclosure, by way of example, unless stated otherwise, 'image integrity' will be used to describe the desired effect obtained as the result of the reaction between reactive fluids, for example, between an ink reactive with the reactant fluid or between two inks reactive with one another. Furthermore, the term 'image integrity' will encompass print attributes such as bleed alleviation, reduced dry time, smudgefastness, smearfastness, permanence, increased optical density, and waterfastness that may be affected as a result of the reaction between two reactive fluids. Additionally, when referring to an ink reaction with the reactant fluid, the ink may be also reactive with another, second ink.

The present invention is directed to fluid sets, in particular for use in coloring applications, and more particularly for use in ink-jet printing. The present fluid set combines the benefits of interactive fluids while utilizing dyes providing enhanced image integrity to the ink-jet formula. The fluid set may be used in many applications of aqueous-based printing inks, in particular ink-jet inks for use in commercially available ink-jet printers such as DESKJET® printers, manufactured by Hewlett-Packard Company, of Delaware; and other commercially available home or office ink-jet printers.

Aqueous inks of this invention comprise, by weight, from about 0.5 to about 20 wt % colorant, preferably from about 1 to about 10%, and more preferably from about 1 to about 6 wt % colorant; from about 1 to about 40 wt % of one or more organic solvents; and optionally up to about 20 wt % of an additive independently selected from the group consisting of immobilizing agents, surfactants, buffers, biocides, and mixtures thereof, with the proviso that at least one colorant in at least one ink is selected from dyes according to Formula I, II, III or IV.

Colorants

At least one of the inks of the present fluid set contains at least one colorant according to the present invention (i.e., 'first colorant'), the colorant selected from the group consisting of dyes of Formula I, II, III and IV. Without being limited by theory, it is believed that the dyes of this invention interact with the reactive fluid, or $5^{th}$ fluid, to form a gel or precipitate on the media which provides the benefits referred to above. It is believed that these dyes interact with the print media (cellulose fibers making up paper) through hydrogen bonding interactions and do not penetrate the paper as quickly as many other dyes. This allows time for the interaction between the dyes and the reactive fluid to form the gel or precipitate, thereby providing the benefit.

For ease of reference, as used herein, the term 'first colorant' refers to dyes of the present invention while the term 'second colorant' refers to all other suitable colorants that may be used in conjunction with the first colorant of this invention in an inkset.

Other colorants ('second colorants') may be dye-based and/or pigments based. As used herein, the term 'pigment' refers to a colorant that is insoluble in the aqueous vehicle, and includes disperse dyes as well as pigments that are either dispersed with the aid of a dispersant or those that are self-dispersed. The term 'colorant' refers to either or both 'first' and 'second' colorant.

The first colorants of the present invention are represented by any of the following structures:

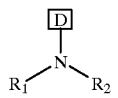

Formula I

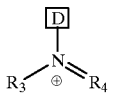

Formula II

-continued

Formula III

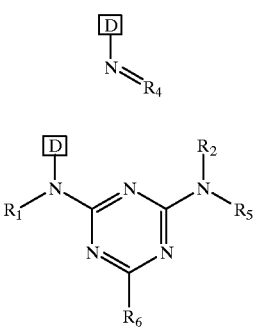

Formula IV

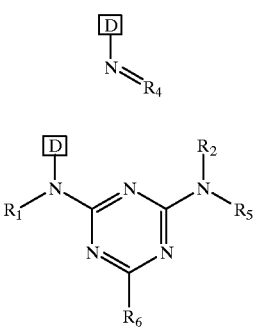

Wherein
D is the chromophore;
R$_1$ is H or C$_1$–C$_5$, preferably H or CH$_3$, and more preferably H;
R$_2$ is a carbohydrate as defined by substructure A;
R$_3$ is C$_1$–C$_5$, preferably CH$_3$;
R$_4$ is a carbohydrate as defined by substructure B;
R$_5$ is defined by substructure C;
R$_6$ is selected from the group consisting of —OH, —R$_7$CO$_2$H wherein R$_7$ is an aromatic or aliphatic moiety substituted with a CO$_2$H group, —R$_8$SO$_3$H wherein R$_8$ is an aromatic or aliphatic moiety substituted with an —SO$_3$H group, NR$_1$R$_8$ wherein R$_8$ is an aromatic moiety, —C≡N, —Cl, D wherein D is a chromophore as defined above; and NR$_2$R$_5$ (amino carbohydrate) wherein R$_2$ and R$_5$ are as defined above.

Substructure A

Substructure B

Substructure C

Wherein
m is 1–5, preferably 1–2, and more preferably 1;
n is 2–7, preferably 3–5, and more preferably 4;
w is 0–4, preferably 0–1, and more preferably 0;
x is 2–7, preferably 2–5, and more preferably 3;
y is 0–1, preferably 1;
z is 0–3, preferably 0–1, and more preferably 0.

In the preferred embodiment, R$_6$ is selected from the group consisting of —OH, —R$_7$CO$_2$H, —R$_8$SO$_3$H, and —NR$_1$R$_8$, and more preferably, R$_4$ is —OH or R$_7$CO$_2$H; wherein R$_1$, R$_7$ and R$_8$ are as defined above.

The suitable starting dye (parent) for Formula I, Formula II and Formula III dyes contains a chromophore and has a primary or secondary amine functionality (i.e., —NHR$_1$). The suitable starting dye (parent) for Formula IV contains a chromophore and has a primary or secondary amine functionality (i.e., —NHR$_1$). Furthermore, the starting dye may be a commercial dye having a chloro-substituted triazabenzene reactive group (e.g., compound C1) or it may be a dye without such a reactive group (e.g., compound C2), in which case the latter dye may be reacted with a chloro-substituted triazabenzene ring (compound C3) to produce the former dye containing the reactive group (see Reaction Schemes 1–4) before the synthesis of the dyes of the present invention.

Compound C1

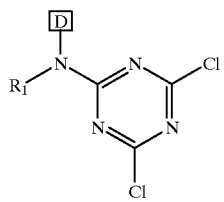

Compound C2

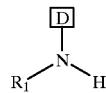

Compound C3

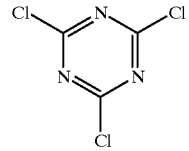

Examples of suitable starting dyes include, but are not limited to: acid alizarin brown RP, acid blue 129, acid blue 25, acid blue 29, acid blue 40, acid blue 41, acid yellow 66, acid yellow 69, acid yellow 9, basic blue 16, basic blue 11, basic blue 7, basic orange 2, basic red 2, basic red 5, basic red 9, basic violet 14, basic violet 2, cotton orange G, cresyl violet acetate, direct blue 1, direct blue 71, direct brown 191, Avecia 286/287 (also available under the trade name Projet Black 1/Projet Black 2), disperse black 1, disperse black 2, disperse black 3, and disperse black 4; dichlorotriazinyl dyes such as (i.e., dyes having two chlorines on the triazene ring to be substituted with one or two equivalents of amino carbohydrate (i.e., —NR$_2$R$_5$) reactive yellow 3, reactive red 2, reactive red 5, reactive red 4 (available from Avecia); monochlorotriazinyl dyes, such as reactive yellow 127, reactive red 24, reactive blue 15, reactive violet 2 and reactive black 1.

Reactions and Reactive Components or Reactive Agents

The reactant fluids of this invention are preferably applied either or both under and over the ink layer in the printing process using methods known in the art for 5$^{th}$ pen applications.

The present invention can be employed in any reactive system, regardless of the purpose for the reaction, where the reactant fluid is reactive with the ink comprising the dyes of the present invention, and in addition, also when an ink of the present invention and another ink react with one another. The one or more reactions can serve can serve to enhance any one of a number of desired image integrity attributes. Furthermore, the reaction scheme, between any two fluids reactive with one another may be the same or different than reaction scheme between any other two reactive fluids. Depending on the reaction mechanism employed, the reactive fluid is selected to interact with the ink formula containing the above inks.

For example, when the reaction mechanism for reducing bleed is through precipitation of a pH-sensitive colorant, the fluid reactive with such ink comprises an acid in sufficient amount to render the pH-sensitive colorant of the ink insoluble upon contact, as disclosed in U.S. Pat. No. 5,181,045, entitled "Bleed Alleviation using pH sensitive Dyes/Inks"; U.S. Pat. No. 5,785,743, entitled "Bleed Alleviation in Ink-Jet Inks using Organic Acids," filed by Adamic et al. On Dec. 6, 1995; and U.S. Pat. No. 5,679,143, entitled "Bleed Alleviation in Ink-Jet inks Using Acids Containing a Basic Functional Group."

Similarly, when the reaction mechanism is based on the use of a precipitating agent, such as multi-valent metal salts, as disclosed in the U.S. Pat. No. 5,428,383, the fluid reactive with such ink comprises a precipitating agent, e.g., multi-valent metal salt.

Alternatively, the reaction between an ink and a reactant fluid may be based on the two fluids having components with opposite charges. For example, the ink may have a negatively charged colorant and the reactant fluid may contain a positively charged ingredient (or a component with a positively charged moiety), such that upon contact the colorant in the ink becomes immobilized. Examples of such positively charged components are polymers, dispersants on a pigment (in the case where the reactive fluid is another ink), self-dispersed pigments (in the case where the reactive fluid is another ink), and cationic surfactants.

Similarly, when there are multiple reaction schemes, all desired reactive components compatible with one another in a given fluid composition may be present in the reactant fluid and any other reactive ink, such as those disclosed in, as for example, U.S. patent application Ser. No. 09/064,643, entitled "Ink Set for Improved Print Quality," by Ma et. al., filed Apr. 22, 1998, and assigned to the same assignee as the present invention, and incorporated herein by reference in its entirety. For example, Ma discloses a set of printing liquids having multiple interactions:

The reaction between the black and magenta inks is caused by the pH difference between the two inks and the excess hydrogen ions form the magenta ink. The black ink and the yellow ink react by virtue of the opposite charge between the dispersants for the black and the yellow pigments. The black ink and the cyan ink react due to the precipitation of the dispersed black pigment by the multi-valent metal ions (precipitating agent). Additionally, when the fourth ink (e.g., cyan) contains the optional acid, the pH difference between the cyan and the black ink further enhances the precipitation of the colorant in the black ink. The reaction between the magenta and the yellow inks is caused by the opposite charge between the dispersants for the magenta and the yellow pigments. The magenta and the cyan inks react by virtue of the multivalent metal precipitating the dispersed magenta pigment. And, finally, the yellow ink and the cyan ink react due to the opposite charge between the dispersed yellow pigment and the cyan dye.

In the present invention, the reactant fluid may contain all of the aforementioned reactive components compatible with one another so as to provide for the proper reaction mechanisms between the reactant fluid and an ink reactive with the reactant fluid or between two inks reactive with one another.

It is also within the scope of the present invention to have a fluid set wherein the reactant fluid may have to react with more than one ink to achieve the desired result (that is, the reactant fluid may provide a component such that in the event that the reactant fluid and two inks come into contact with one another on a print medium a desirable reaction occurs).

Furthermore, the reactant fluid may contain polymeric or cross-linkable components for rendering the images more permanent. For example, the reactive fluids (e.g., the reactant fluid and an ink reactive with the reactant fluid) may each contain a component that will react with the component in the other reactive fluid such that upon reacting it will render the printed image more permanent.

Preferably, the ink containing the dyes of the present invention is reactive with the reactant fluid, optionally it can also react with another ink. Preferably all of the inks selected for use in the ink set are reactive with the reactant fluid. The reactant fluid comprises at least one component for reactiving with at least one ink containing the above described dyes. Additionally, but optionally, the reactive fluid may comprise any other component which serves to aid the performance of the fluid in the inkjet printer. For example, water, solvents, surfactants, and biocides may be employed.

The reaction between the reactive fluids may employ any one of several reactive mechanisms well-known in the art such as the use of a pH-sensitive colorant, or the use of a precipitating agent, as described in the aforementioned patents and applications. As stated earlier, the reaction between the reactive fluids can serve to enhance any one of a number of print system attributes. Furthermore, the reaction scheme, between the reactive fluid and one ink may be the same or different than reaction schemes between the reactive fluid and a second ink.

Examples of immobilizing agents include: precipitating agents such as inorganic salts (preferably divalent or trivalent salts of chloride and/or nitrate such as $Mg(NO_3)_2$, $Ca(NO_3)_2$, $CaCl_2$, $MgCl_2$, $AlCl_3$, $Al(NO_3)_3$ and the hydrates of these agents, organic acids such as succinic acid, citric acid, glutaric acid, morpholinoethane sulfonic acid, boronic materials such as boric acid and the ammonium or sodium salts of borates, cationic surfactants such as Unamine O (available form Lonza) and dodecyltrimethylammonium chloride, and polymeric cationic reagents such as acidified PEI, poly(diallyldimethyl)ammonium chloride, and acidified poly(allylamine).

The reactive fluid, in addition to water and the reactant agent described above, may also contain one or more of the same ingredients and in the same % amounts commonly formulated into inks. For instance, solvents, surfactants, amphiphiles, biocides, buffers may be present in the reactive fluids of this invention.

Additional Colorants or Inks

Examples of suitable second colorants herein include organic dyes having at least one and preferably two or more carboxyl and/or carboxylate groups, examples of which are listed in U.S. Pat. No. 4,963,189 (filed by Hindagolla and assigned to the same assignee as the present invention, and incorporated herein by reference), and carboxylated pigments dispersions having a water insoluble colorant (e.g., pigment) dispersed with a dispersant preferably containing carboxylate solubilizing groups, such as those disclosed in U.S. Pat. No. 5,085,698, and U.S. Pat. No. 5,555,008, both incorporated herein by reference, or self-dispersed pigments provided under the Trade name Cabojet™ by Cabot Company.

The fluids of the present invention may comprise from about 1 to about 40 wt % of at least one organic solvent. More preferably the fluids comprise from about 1 to about 25 wt % of at least one organic solvent with from about 5 to about 15 wt % being the more preferred. Optionally, one or more water-soluble surfactants/amphiphiles (0 to about 40 wt %, preferably about 0.1 to about 5 wt %) may be present. The inks of this invention have a pH in the range of from about 7 to about 11, preferably from about 8 to about 10, more preferably from about 8 to about 9. The $5^{th}$ pen fluids of this invention have a pH in the range of from about 2.5 to about 7, preferably from about 3 to about 6, more preferably from about 4 to about 5.

Aqueous Vehicle

All concentrations herein are expressed in weight percentages, unless otherwise indicated. The purity of all components is that employed in normal commercial practice for ink-jet inks. All cited documents and patents are hereby incorporated by reference.

Other ingredients added to the inks of this invention should be compatible with the above colorants employed in this invention. Likewise, other ingredients added to the reaction fluids of this invention should be compatible with the above reactive agents employed in this invention.

The aqueous vehicle is water or a mixture of water and at least one water-soluble organic solvent, as is well-known in the art. Selection of a suitable mixture depends on requirements of the specific application, such as the desired surface tension and viscosity, the selected colorant or reactive agent, drying time of the ink-jet fluid, and the type of print medium onto which the fluid will be printed. For a discussion of inks and their properties, see *The Printing Manual*, $5^{th}$ Ed., Leach et al. (Chapman and Hall, 1993). See also U.S. Pat. Nos. 2,833,736; 3,607,813,; 4,104,061; 4,770,706; and 5,026,755.

The water soluble organic solvents suitably employed in the present ink-jet ink compositions include any of, or a mixture of two or more, of such compounds as nitrogen-containing ketones, such as 2-pyrrolidinone, N-methyl-2-pyrrolidinone (NMP), 1,3-dimethylimidazolid-2-one, and octyl-pyrrolidinone; diols such as ethanediols (e.g., 1,2-ethanediol), propanediols (e.g., 1,2-propanediol, 1,3-propanediol), butanediols (e.g., 1,2-butanediol, 1,3-butanediol, 1,4-butanediol), pentanediols (e.g., 1,2-pentanediol, 1,5-pentanediol), hexanediols (e.g., 1,2-hexanediol, 1,6-hexandiol, 2,5-hexanediol), heptanediols (e.g., 1,2-heptanediol, 1,7-heptanediol), octanediols (e.g., 1,2-octanediol, 1,8-octanediol); triolos such as 2-ethyl-2-hydroxymethyl-1,3-propanediol and ethylhydroxypropanediol (EHPD); and glycol ethers and thioglycol ethers, commonly employed in ink-jet inks such as polyalkylene glycols such as polyethylene glycols (e.g., diethylene glycol (DEG), triethylene glycol, tetraethylene glycol), polypropylene glycols (e.g., dipropylene glycol, tripropylene glycol, tetrapropylene glycol, polymeric glycols (e.g., PEG 200, PEG 300, PEG 400, PPG 400) and thiodiglycol. Prefereably 2-pyrrolidinone, NMP, DEG, EHPD and 1,5-pentanediol are employed in the practice of this invention with 2-pyrrolidinone, DEG and 1,5-pentanediol being the most preferred solvents.

Suitable surfactants may be nonionic or anionic when used in the fluid vehicle. Examples of suitable nonionic surfactants include, secondary alcohol ethoxylates (e.g., Tergitol series available form Union Carbide Co.), nonionic fluoro surfactants (such as FC-170C available from 3M), nonionic fatty acid ethoxylate surfactants (e.g., Alkamul PSMO-20 available from Rhone-Poulenc), fatty amide ethoxylate surfactants (e.g., Aldamide L-203 available from Rhone-Poulenc), and acetylenic polyethylene oxide surfactants (e.g., Surfynol series, available from Air Products & Chemicals, Inc.). Examples of anionic surfactants include alkyldiphenyloxide surfactants (such as Calfax available from Pilot), and Dowfax (e.g., Dowfax 8390 available from Dow), and fluorinated surfactants (Fluorad series available form 3M). Cationic surfactants may be used in the reactive fluid which interacts with the ink vehicle and/or ink vehicle colorant. Cationic surfactants that may be used include betaines (e.g., Hartofol CB-45 available from Hart Product Corp., Mackam OCT-50 available form McIntyre Group Ltd., Amisoft series available from Ajinomoto), quaternary ammonium compounds (e.g., Glucquat series available from Amerchol, Bardac and Barquat series available from Lonza), cationic amine oxides (e.g., Rhodamox series available form Rhone-Poulenc, Barlox series available from Lonza) and imidazoline surfactants (e.g., Miramine series available from Rhone-Poulenc, Unamine series available from Lonza).

Buffers may be used to modulate pH and they can be organic based biological buffers or inorganic buffers such as sodium phosphate. Furthermore, the buffer employed should provide a pH ranging from about 4 to about 9 in the practice of the invention. Examples of preferably employed organic buffers include Trizma base, available from companies such as Aldrich Chemical (Milwaukee, Wis.), 4-morpholinoethanesulfonic acid (MES) and 4-morpholinopropanesulfonic acid (MOPS).

Any of the biocides commonly employed in ink-jet inks may be employed in the practice of the invention, such as NUOSEPT 95, available form Hals America (Piscataway, N.J.); Proxel GXL, available from Avecia (Wilmington, Del.); and glutaraldehyde, available from Union Carbide Company (Bound Brook, N.J.) under the trade designation UCARCIDEW 250. Proxel GXL is the preferred biocide.

Printing Methods

This invention also encompasses a method for inkjet printing with the colorants and $5^{th}$ pen fluids discussed above.

Ink containing one or more of the colorants having a structure selected from the group consisting of Formula I, Formula II, Formula III, or Formula IV is printed onto a substrate, such as paper, textile or transparency. Next, the ink is overprinted with a layer of $5^{th}$ pen fluid such that the ink comes into contact with the reactive agent in the reactive fluid. The colorants in the ink then react with the reactive agent to form a gel or precipitate.

Alternatively, the $5^{th}$ pen fluid may be underprinted as a first layer on the substrate and then the ink is overlaid on top of the $5^{th}$ pen fluid layer. And in another alternative, the $5^{th}$ pen fluid is both underprinted and overprinted with the ink layer.

Method of Synthesis

The dyes of the present invention may be synthesized using the general procedures and conditions described below:

Synthesis of Formula I

Procedure 1: Dissolve one molar equivalent of the starting dye in deionized water with one molar equivalent of the carbohydrate (i.e., compound having $R_2$ or $R_4$ functionality). Add 2 molar equivalents of hydrochloric acid to the reaction mixture and stir vigorously. Slowly add a molar equivalent of sodium cyanoborohydride (dissolved in methanol) to the reaction mixture. After addition of the sodium cyanoborohydride, slowly warm the reaction mixture to reflux and continue refluxing for a period of 4–8 hours. At the end of the reflux period, cool the reaction to room temperature, add enough hydrochloric acid to evolve hydrogen cyanide from the excess sodium cyanoborohydride.

Concentrate the reaction mixture using reduced pressure and purify with the use of a silica gel column using acetonitrile and water as the eluent.

Procedure 2: A second synthesis to form compounds of type Formula I may be performed on dyes of Formula III. Dissolve the Formula III compound in tetrahydrofuran, add 2 molar equivalent of acid (e.g., 2-naphthalenesulfonic acid) to the reaction mixture. Slowly add a 2 molar equivalent of sodium cyanoborohydride (dissolved in methanol) to the reaction mixture. After addition of the sodium cyanoborohydride, slowly warm the reaction mixture to reflux and continue refluxing for a period of 4–8 hours. At the end of the reflux period, cool the reaction to room temperature. Concentrate the reaction mixture using reduced pressure and purify with the use of a silica gel column using acetonitrile and water as the eluent.

Synthesis of Formula II or Formula III

Dissolve one molar equivalent of the dye in acetonitrile along with a four molar equivalent of the carbohydrate. Add a catalytic amount of hydrochloric acid to the reaction mixture and stir vigorously while refluxing for a period of 2–4 hours. After refluxing, cool the reaction to room temperature and remove the solvent under reduced pressure. Purify the dye using a silica gel column and acetonitrile as the eluent.

EXAMPLE #1

Synthesis of Acid Blue TS-1

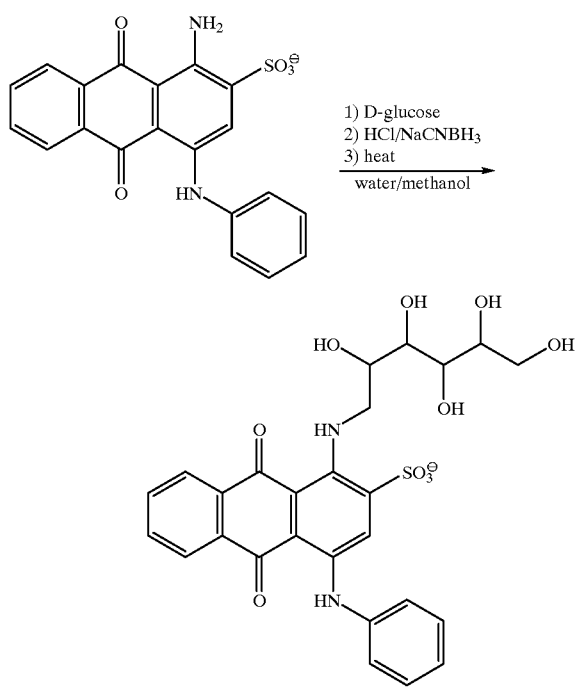

In a 500 mL, 3-neck, round bottom flask 4.27 g. of Acid Blue 25 and 4.69 g. of D-glucose is added and dissolved in 150 mL of deionized water. The flask is fitted with a reflux condenser and an addition funnel and the reaction mixture stirred vigorously. The reaction mixture then has 2.00 g. of concentrated hydrochloric acid (36%) added, while in the addition funnel 1.60 g. of sodium cyanoborohydride is dissolved in methanol. After allowing the D-glucose and Acid Blue 25 to react for 30 minutes in the presence of hydrochloric acid, the sodium cyanoborohydride is slowly added to the reaction mixture. Upon complete addition of the sodium cyanoborohydride, the reaction is gently refluxed for 2 hours and then allowed to cool to room temperature. Additional hydrochloric acid is then added (to destroy excess sodium cyanoborohydride) and the reaction mixture concentrated under reduced pressure. The dye (acid blue TS-1) is then purified on a silica gel column using acetonitrile and water as the eluents.

EXAMPLES #2

Synthesis of Basic Red TS-2

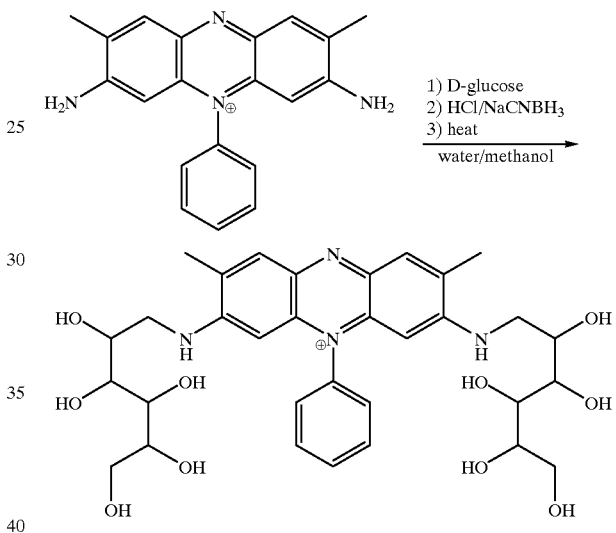

In a 500-mL, 3-neck, round bottom flask 4.49 g. of Basic Red 2 and 7.49 g. of D-glucose is added and dissolved in 150 mL of deionized water. The flask is fitted with a reflux condenser and an addition funnel and the reaction mixture stirred vigorously. The reaction mixture then has 4.90 g. of concentrated hydrochloric acid (36%) added, while in the addition funnel, 3.48 g. of sodium cyanoborohydride is dissolved in methanol. After allowing the D-glucose and Basic Red 2 react for 30 minutes in the presence of hydrochloric acid, the sodium cyanoborohydride is slowly added to the reaction mixture. Upon complete addition of the sodium cyanoborohydride, the reaction is gently refluxed for 2 hours and then allowed to cool to room temperature. Additional hydrochloric acid is then added (to ensure the solution is acidic to destroy any excess sodium cyanoborohydride) and the reaction mixture concentrated under reduced pressure. The dye (basic red TS-2) is then purified on a silica gel column using acetonitrile and water as the eluents.

EXAMPLE #3

Synthesis of Direct Blue TS-1

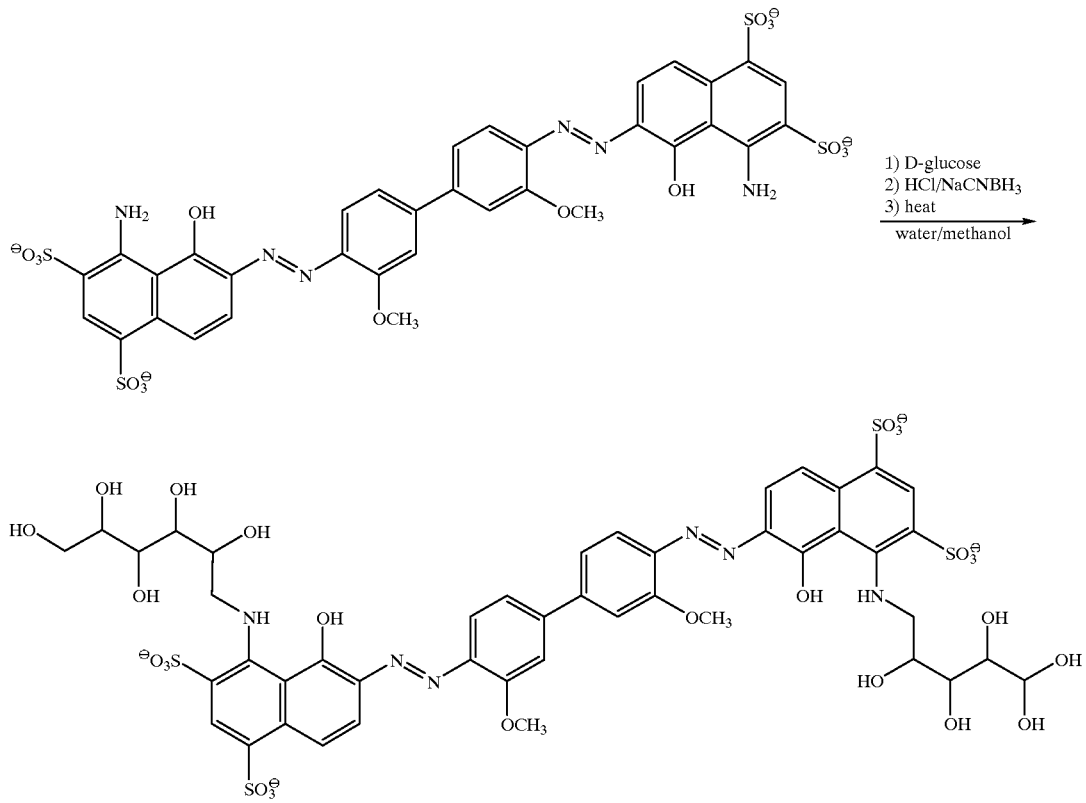

In a 500 mL, 3-neck, round bottom flask 6.73 g. of Direct Blue 1 and 6.32 g. of D-glucose is added and dissolved in 150 mL of deionized water. The flask is fitted with a reflux condenser and an addition funnel and the reaction mixture stirred vigorously. The reaction mixture then has 2.87 g. of concentrated hydrochloric acid (36%) added, while in the addition funnel 1.80 g. of sodium cyanoborohydride is dissolved in methanol. After allowing the D-glucose and Direct Blue 1 to react for 30 minutes in the presence of hydrochloric acid, the sodium cyanoborohydride is slowly added to the reaction mixture. Upon complete addition of the sodium cyanoborohydride, the reaction is gently refluxed for 2 hours and then allowed to cool to room temperature. Additional hydrochloric acid is then added (to ensure destruction of any excess sodium cyanoborohydride) and the reaction mixture concentrated under reduced pressure. The dye (direct blue TS-1) is then purified on a silica gel column using acetonitrile and water as the eluents.

The dyes of Formula IV may be synthesized using standard procedures such as those described in U.S. Pat. No. 5,722,745, and the reactions described in Reaction Scheme 1–4.

Reaction Scheme 1

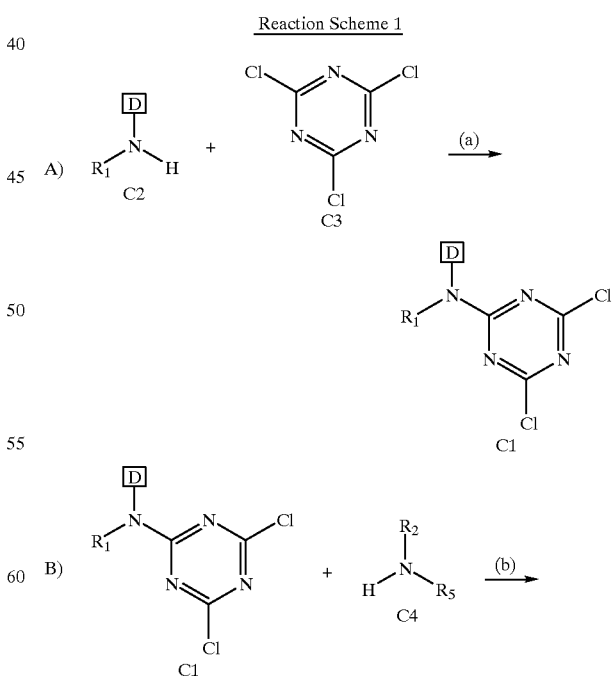

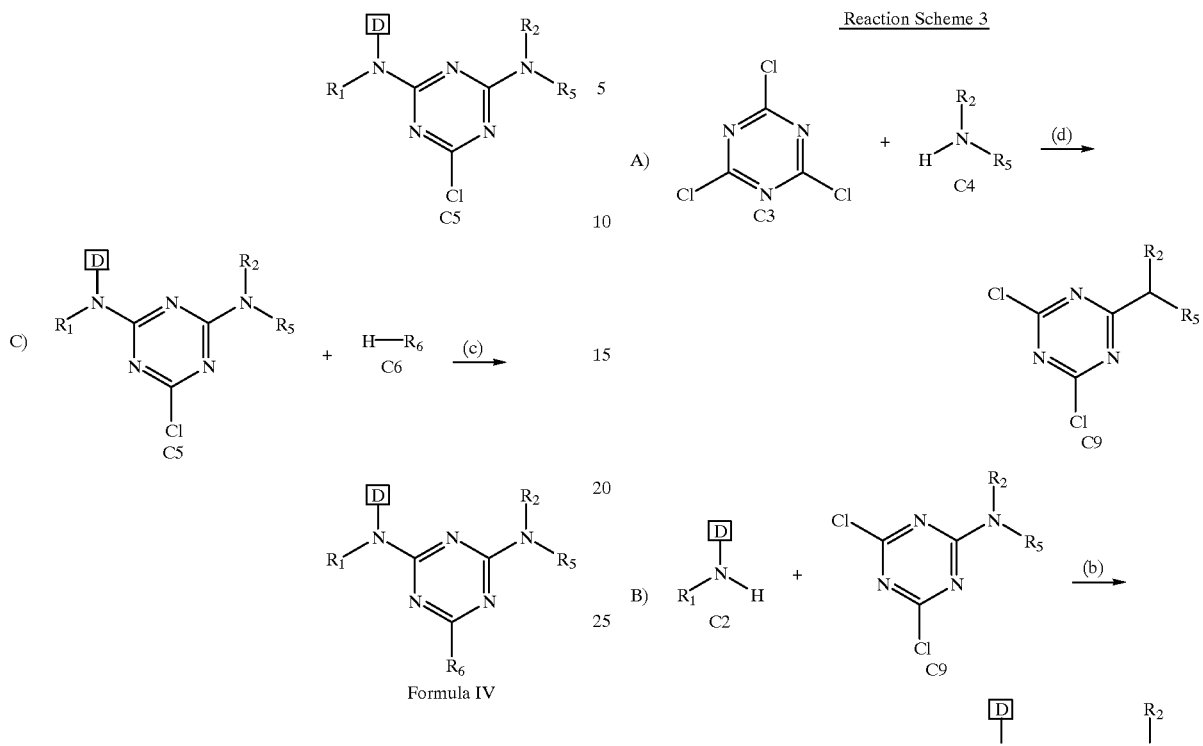
Reaction Scheme 2
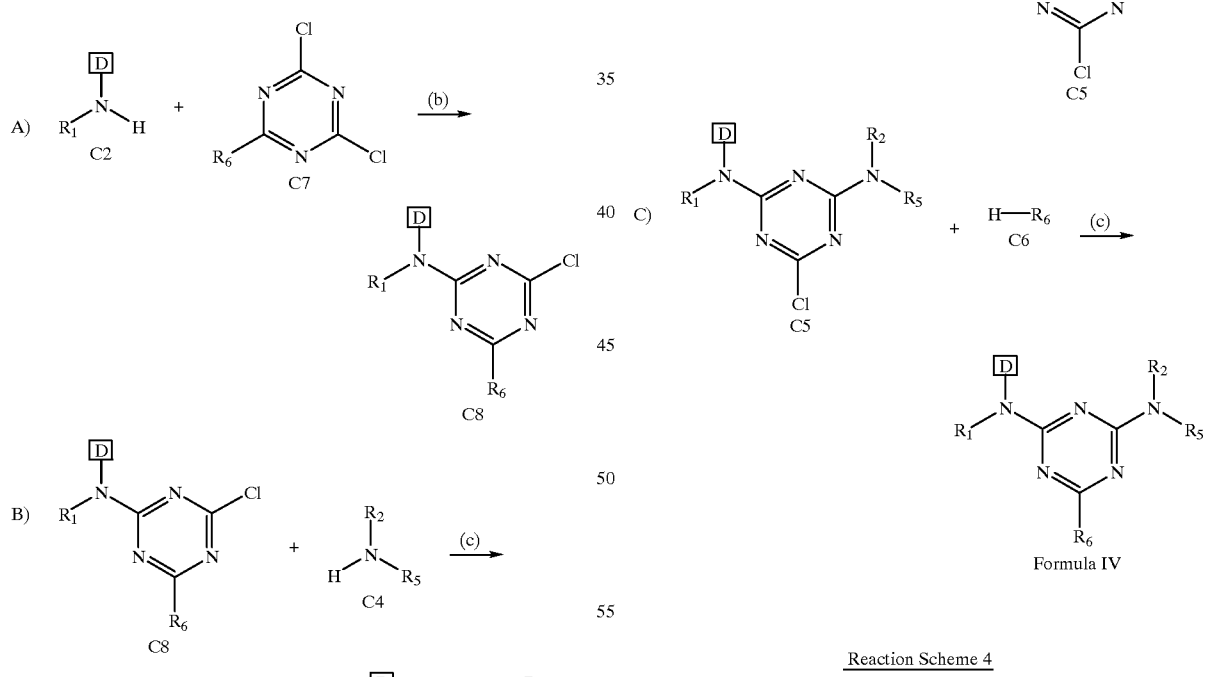
Reaction Scheme 3
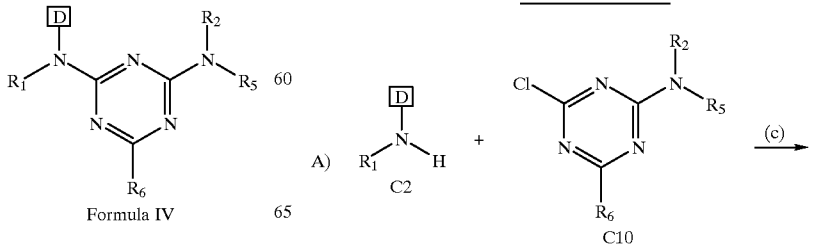
Reaction Scheme 4

-continued

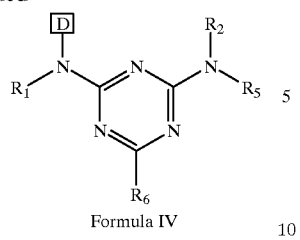

Formula IV

The following exemplify the typical reaction conditions designated as a, b, c or d in the Reaction Schemes 1–4:

Reaction (a): Dissolve dye/chromophore (such as Compound C2 in synthesis Reaction Scheme 1) in water at neutral pH (pH~7) and add to an ice cold suspension of cyanuric chloride (ice bath made up from 1:1 acetone:ice water) at a dye/chromophore to cyanuric chloride (Compound C3) molar ratio of about 1:1. Stir the reaction mixture for about 2 hours. The reaction product (such as Compound C1 in Reaction Scheme 1) may then be isolated through precipitation methods, rinsing with hexanes and followed by drying the precipitate.

Reaction (b): Dissolve the dichlorotriazinyl compound (such as Compounds C1, C7 and C9 in Reaction Schemes 1, 2, or 3, respectively) in water at neutral pH (pH~7) and add a one molar equivalent of the reactive material (such as Compounds C2 and C4 in Reaction Schemes 1, 2 or 3, respectively) (dissolved in water at pH~7). Raise the temperature to 35° C. and allow reaction to proceed overnight. The reaction product (such as Compounds C5 and C8, in Reaction Schemes 1, 2 or 3, respectively) may then be isolated through precipitation methods, rinsing with hexanes and drying. If the reactive material is the amino carbohydrate (as in Compound C4 in Reaction Scheme 1) and R4 is an amino carbohydrate (as in Compound C8 in Reaction Scheme 2), then this reaction may be run at 70–75° C. for 6 hours before isolating the final product.

Conversely, an alternate procedure may be used to selectively generate the mono-substituted compound (such as Compound C5 in Reaction Scheme 1) when using a dichlorotriazinyl substituted dye (such as Compound C1 in Reaction Scheme 1) as the starting material. Into the reaction vessel, suspend the dichlorotriazinyl compound, 1 molar equivalent of the amino carbohydrate (an excess may be used with this process since only one equivalent will be placed on the triazo ring), and 1 molar equivalent of $NaHCO_3$ (sodium bicarbonate) in acetonitrile ($CH_3CN$). Add to the reaction mixture a catalytic amount of DTAB (dodecyltrimethylammonium bromide). Allow the reaction to reflux for about 1 week, at which time the product may be isolated by removing the solvent and purifying the product through column chromatography using silica gel and acetonitrile/water as the eluent.

Reaction (c): Dissolve the monochlorotriazinyl compound (such as Compound C1, C8 and C10 in Reaction Schemes 1 or 3, 2 and 4, respectively) in water along with the reactive material (such as Compound C6, C4, C2 in Reaction Schemes 1 or 3, 2, and 4, respectively). Dissolve two molar equivalents of $NaHCO_3$ (sodium bicarbonate) in the reaction solution. Raise the temperature to about 70–75° C. and maintain this temperature for about 6 hours. Isolate the final product (Formula IV) through precipitation methods and rinsing with hexanes and drying.

Reaction (d): Dissolve the amino carbohydrate (such as Compound C4 in Reaction Scheme 3) in water at neutral pH (pH~7). Add to an ice cold suspension of cyanuric chloride (ice bath made up from 1:1 acetone:ice water) at a molar ratio of 1:1. Stir the reaction mixture for 2 hours before proceeding to the next step of the synthesis.

EXAMPLE #4

Synthesis of Acid Red SA-1

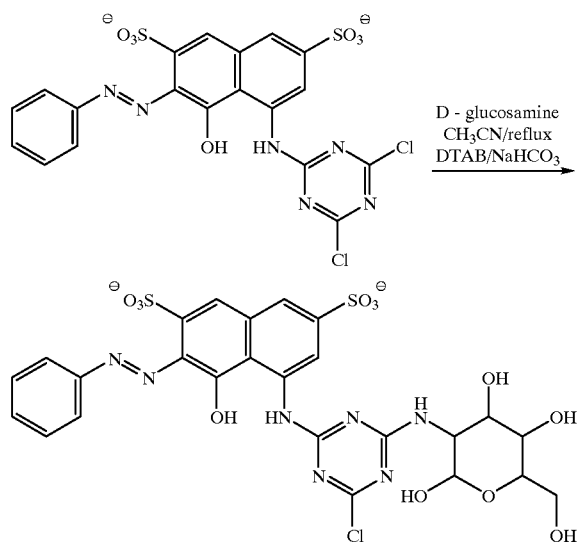

5.01 g. of Reactive Red 2 (available from Aldrich Chemical Co.—also named Procion Red MX-3B) is placed in a 300 mL round bottom flask along with 1.75 g. of D-glucosamine hydrochloride (slight excess), 1.40 g. of sodium bicarbonate (to neutralize two equivalents of HCl) and 0.20 g. of dodecyltrimethylammonium bromide (to act as a catalyst for the reaction). Approximately 150 mL of acetonitrile is added to this mixture. The new mixture is refluxed for about one week (with periodic TLC (thin layer chromatography) checks to assess the progress of the reaction) until the reaction has proceeded to completion. The acetonitrile is removed under reduced pressure and the resulting dye is purified via column chromatography and verified by LC/MS.

EXAMPLE #5

Synthesis of Acid Red SA-3

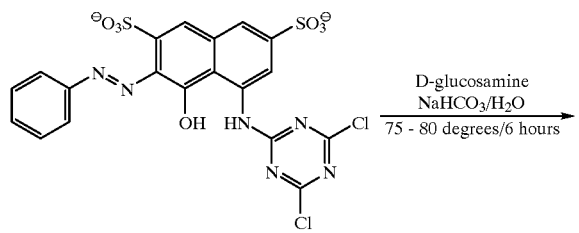

-continued

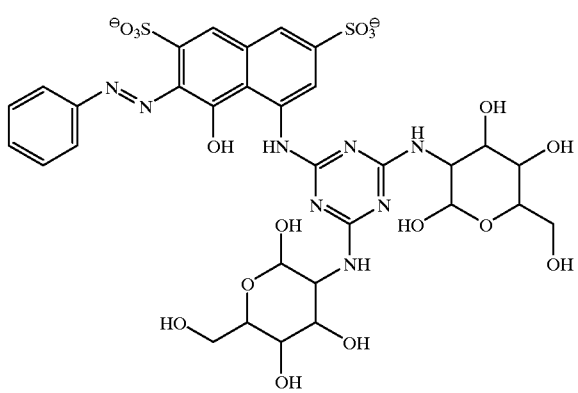

5.0 g. of D-glucosamine hydrochloride is dissolved in approximately 150 mL of water and neutralized to pH 7 using 1.0 M NaOH (sodium hydroxide) in a 300 mL round bottom flask. To this mixture is added a 50 mL solution containing 7.0 g. of Reactive Red 2 and 2.0 g. of sodium bicarbonate (to neutralize 2 equivalents of HCl) dissolved in water. The reaction vessel is fitted with a thermometer and the reaction is heated to about 75–80° C. for a period of 6 hours before cooling the reaction to room temperature. The dye is then concentrated under reduced pressure and then purified on a silica gel column.

EXAMPLE #6

Synthesis of Acid Blue SA-1 bilizing fluids are used with these dyes, and improvements with various types of immobilizing fluids are observed with these of dyes.

The recorded values as shown below are for the derivatized dyes AB SA-1, AB SA-2, AR SA-1, AR SA-2, AY SA-1, AR TS-1a, AR TS-1b, AR TS-2+ and AR TS-3+. These values are compared to the parent dyes (reactive blue 2, reactive blue 4, reactive red 2, S66895 (available from Avecia), acid yellow 127, S174216, S173946, S176831 and S 175567 (all available from Avecia), respectively).

TABLE 1

Underprinting/Overprinting Effects with Derivatized Dyes.

| Dye | Parent Dye | Waterfastness (% Improvement) | Smearfastness (% Improvement) |
| --- | --- | --- | --- |
| AB SA-1 | Reactive Blue 2 | 24 | 8.6 |
| AB SA-2 | Reactive Blue 4 | 13 | 6.4 |
| AR SA-1 | Reactive Red 2 | 10 | 7.0 |
| AR SA-2 | S66895 | 8 | 3.0 |
| AY SA-1 | Acid Yellow 127 | 7 | n/a |
| AR TS-1a | S174216 | 6 | 3.2 |
| AR TS-1b | S173946 | 4 | 8.7 |
| AR TS-2+ | S176831 | 8 | 4.6 |
| AR TS-3+ | S175567 | 15 | 21.2 |

The values obtained in this data is the average taken of several readings using 'fixative' agents which include: cationic polymers (acidified PEI), cationic surfactants (dodecyltrimethylammonium chloride and Unamine O), inorganic salts ($Ca^{2+}$ and $Mg^{2+}$) as well as an organic acid (succinic acid). The underprinting/overprinting reactant fluids are made as described earlier in this invention and consist of the following: humectant (0–40 wt %, preferably 5–30 wt

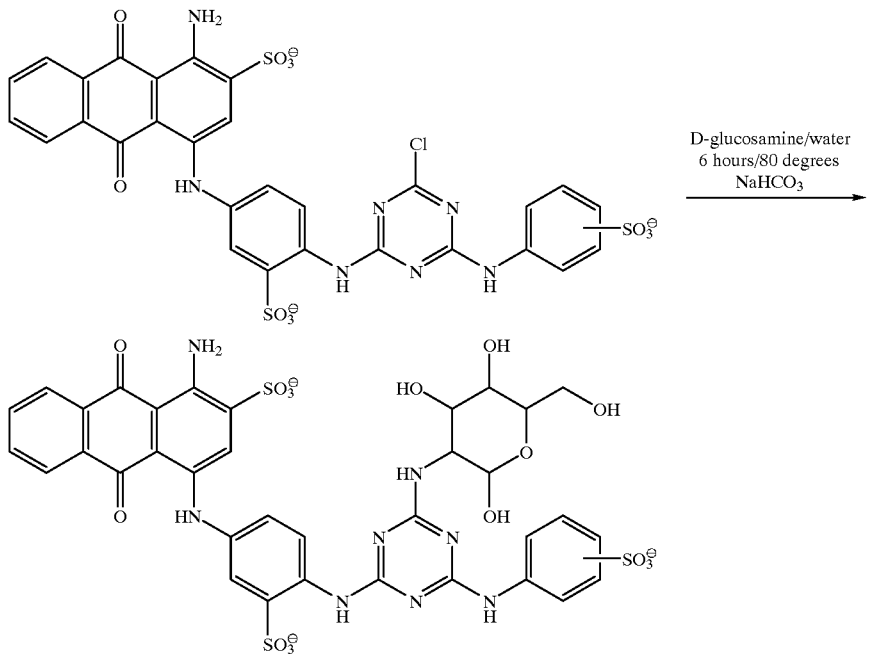

EXAMPLES

Example I

The following data represents the improvement that can be obtained with dyes of this invention in terms of waterfastness and smearfastness. Several different types of immo- %, more preferably 5–20 wt %), surfactant (0–20 wt %, preferably 0.5–10 wt %, more preferably 0.5–5 wt %); fixative agent (either $Ca^{2+}$, $Mg^{2+}$ of 0–20 wt %, preferably 5–15 wt %, more preferably 5–10 wt %; cationic polymer (PEI at pH 3–5, preferably pH=4), 0–20 wt %, preferably 1–10 wt %, more preferably 1–5 wt %; cationic surfactant of 0–20 wt %, preferably 1–10 wt %, more preferably 1–5 wt %; and/or organic acid of 0–40 wt %, preferably 1–20 wt % more preferably 1–10 wt %); anti-cockle/anti-curl reagents (0–40 wt %, preferably 5–30 wt %, more preferably 5–20 wt %); a biocide of 0–5 wt %, preferably 0.1–2 wt %, and more preferably 0.1–0.5 wt %; and a tracer dye that can be tracked by either IR or UV and has no absorption in the visible spectrum (0–10 wt %, preferably 0–5%, more preferably 0.01–1 wt %).

The ink vehicle, because it contains the carbohydrate substituted dyes, may be simplified from 'normal' ink-jet vehicles in that it does not need to contain a humectant to keep the nozzle from clogging due to evaporation of the ink vehicle (primarily water). This is because of the strong hydrogen bonding promoted by the dye itself, with it being in sufficient quantities to prevent the excessive evaporation of water during the lifetime of the pen. Additionally, lower level of surfactants are needed to initiate paper penetration by the dye since the carbohydrate moiety on the dye also acts as a surfactant with increased wetting ability. However, this does not preclude the addition of surfactants to help maximize the efficiency of this operation.

Example II

The following are examples of reaction fluids or 5$^{th}$ pen fluids for use in inkjet printing.

| Component | Reaction Formulations (wt %) | | |
|---|---|---|---|
| | RF-1 | RF-2 | RF-3 |
| 1,5-pentanediol | 2 | 10 | 7 |
| 2-pyrrolidinone | 10 | 4 | 7 |
| Liponics EG-1 | 4 | | |
| Fluorad FC-170C | 2 | | |
| Tergitol 15-S-7 | 2 | 1.5 | 1 |
| Succinic acid | 5 | | |
| PEI (MW = 2,000) | 2.5 | | 2.5 |
| Proxel GXL | 0.2 | 0.2 | |
| Ca(NO$_3$)$_2$.4H$_2$O | | 3.5 | 2.5 |
| Unamine O | 2.0 | | |
| Diethylene glycol | | 6 | |
| Cetyltrimethylammonium chloride | | | 3 |
| Poly(allylamine) (MW = 1,500) | | 3.5 | |

| Composition of Reactive Fluid | |
|---|---|
| LEG-1 (Lipo Chemicals, Inc., Paterson, NJ) | 4 wt% |
| 1,5-pentanediol (Tricon Colors, Inc, Elmwood Park, NJ) | 8 wt% |
| 2-pyrrolidone (Aldrich) | 10 wt% |
| Tergitol 15S7 (Union Carbide) | 2 wt% |
| Fluorad FC170C (3M) | 2 wt% |
| Polyethyleneimine, M=2,000 (Aldrich) | 2.5 wt% |
| Succinic acid (Sigma) | 5 wt% |

| Composition of Reactive Fluid | |
|---|---|
| glycerol (Sigma) | 15 wt% |
| Zonyl FSN (DuPont de Nemours) | 1 wt% |
| cetyltrimethylammonium chloride (Aldrich) | 3 wt% |
| polyethyleneimine, M=2,000 (Aldrich) | 2.5 wt% |
| succinic acid (Sigma) | 5 wt% |

| Composition of Reactive Fluid | |
|---|---|
| 1,5-pentanediol (Tricon Colors, Inc, Elmwood Park, NJ) | 8 wt% |
| 2-ethyl-1,3-propanediol (EHPD) (Aldrich) | 7.5 wt% |
| 2-pyrrolidone (Aldrich) | 7.5 wt% |
| succinic acid (Sigma) | 7 wt% |
| calcium chloride (Aldrich) | 10 wt% |
| Tergitol 15S5 (Union Carbide) | 1.5 wt% |
| Dowfax 8390 (Dow Chemical) | 1 wt% |
| Water | Balance |

What is claimed is:

1. An inkset for inkjet printing comprising:

I) an ink comprising a colorant having a structure selected from the group consisting of Formula I, Formula II, Formula III, Formula IV, and mixtures thereof, wherein;

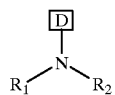

Formula I

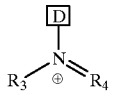

Formula II

Formula III

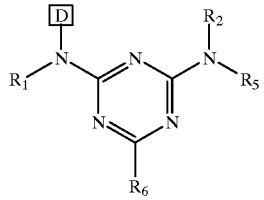

Formula IV wherein

D is a chromophore;

R$_1$ is H or C$_1$–C$_5$;

R$_2$ is a carbohydrate as defined by substructure A;

R$_3$ is C$_1$–C$_5$;

R$_4$ is a carbohydrate as defined by substructure B;

R$_5$ is defined by substructure C;

R$_6$ is selected from the group consisting of —OH, —R$_7$CO$_2$H wherein R$_7$ is an aromatic or aliphatic moiety substitute with a CO$_2$H group, —R$_8$SO$_3$H wherein R$_8$ is an aromatic or aliphatic moiety substituted with an —SO$_3$H group, NR$_1$R$_8$ wherein R$_8$ is an aromatic moiety, —C≡N, —Cl, D wherein D is a chromophore as defined above; and NR$_2$R$_5$ (amino carbohydrate) wherein R$_2$ and R$_5$ are as defined above;

Substructure A

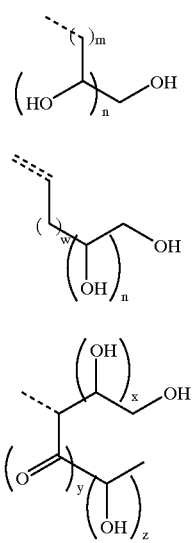

Substructure B

Substructure C wherein
- m is 1–5;
- n is 2–7;
- w is 0–4;
- x is 2–7;
- y is 0–1;
- z is 0–3; and II) a $5_{th}$ pen fluid comprising a reactive agent which reacts with said colorant contact.

2. An inkset according to claim 1 wherein said ink has a pH in the range of from about 7 to about 11 and said $5^{th}$ pen fluid has a pH in the range of from about 3 to about 7.

3. An inkset according to claim 1 wherein said reactive agent said $5^{th}$ pen fluid comprises a salt which reacts with said colorant to form a precipitate.

4. An inkset according to claim 3 wherein said salt is selected from the group consisting of divalent salts of nitrate, trivalent salts of nitrate, divalent salts of chloride, trivalent salts of chloride, and mixtures thereof.

5. An inkset according to claim 1 wherein said reactive agent is selected from the group consisting of organic acids, cationic surfactants, polymeric cationic reagents, and mixtures thereof.

6. A method for inkjet printing comprising the steps of:

I) printing a layer of an ink comprising a colorant having a structure selected from the group consisting of Formula I, Formula II, Formula III, Formula IV, and mixtures thereof onto a medium substrate wherein:

Formula I

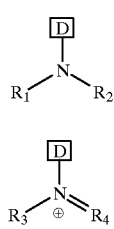

Formula II

Formula III

Formula IV

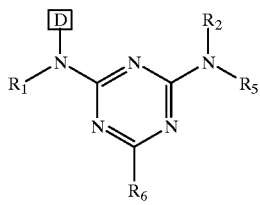

wherein
- D is a chromophore;
- $R_1$ is H or $C_1$–$C_5$;
- $R_2$ is a carbohydrate as defined by substructure A;
- $R_3$ is $C_1$–$C_5$;
- $R_4$ is a carbohydrate as defined by substructure B;
- $R_5$ is defined by substructure C;
- $R_6$ is selected from the group consisting of —OH, —$R_7CO_2H$ wherein $R_7$ is an aromatic or aliphatic moiety, substituted with a $CO_2H$ group, —$R_8SO_3H$ wherein $R_8$ is an aromatic or aliphatic moiety substituted with an —$SO_3H$ group, $NR_1R_8$ wherein $R_8$ is an aromatic moiety, —C≡N, Cl, D wherein D is a chromophore as defined above; and $NR_2R_5$ (amino carbohydrate) wherein $R_2$ and $R_5$ are as defined above;

Substructure A

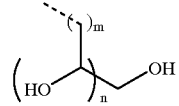

Substructure B

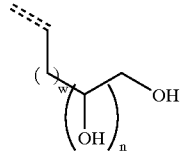

Substructure C

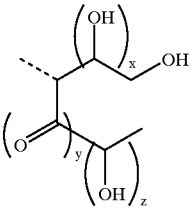

wherein
- m is 1–5;
- n is 2–7;
- w is 0–4;
- x is 2–7;
- y is 0–1;
- z is 0–3; and II) overprinting onto said ink layer a layer of $5^{th}$ pen fluid comprising a reactive agent which reacts with said colorant upon contact.

7. A method for inkjet printing according to claim 6 wherein said ink in step I has a pH in the range of from about 7 to 11 and said $5^{th}$ pen fluid of step II has a pH in the range of from about 3 to about 7.

8. A method for inkjet printing according to claim 6 wherein said reactive agent in said $5^{th}$ fluid comprises a salt which reacts with said colorant to form a precipitate.

9. A method for inkjet printing according to claim 8 wherein said salt is selected from the group consisting of divalent salts of chloride, trivalent salts of nitrate, divalent salts of chloride, trivalent salts of chloride, and mixtures thereof.

10. A method for inkjet printing according to claim 6 wherein said reactive agent is selected from the group consisting of organic acids, cationic surfactants, polymeric cationic reagents, and mixtures thereof.

11. A method for inkjet printing comprising the steps of:
   I) underprinting a layer of $5^{th}$ pen fluid comprising a reactive agent onto a substrate; and
   II) printing a layer of an ink comprising a colorant having a structure selected from the group consisting of Formula I, Formula II, Formula III, Formula IV, and mixtures thereof onto said layer of $5^{th}$ pen fluid; wherein said ink and said $5^{th}$ pen fluid come into contact and wherein said $5^{th}$ pen fluid comprises a reactive agent which precipitates said colorant, wherein:

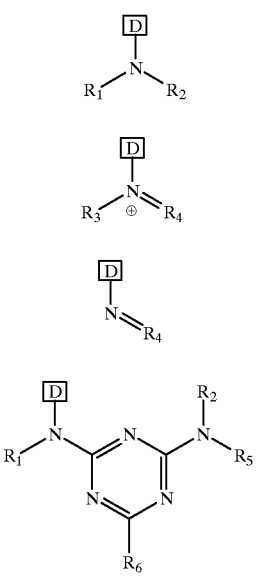

Formula I

Formula II

Formula III

Formula IV wherein
   D is a chromophore;
   $R_1$ is H or $C_1$–$C_5$;
   $R_2$ is a carbohydrate as defined by substructure A;
   $R_3$ $C_1$–$C_5$;
   $R_4$ is a carbohydrate as defined by substructure B;
   $R_5$ is defined by substructure C;
   $R_6$ is selected from the group consisting of —OH, —$R_7CO_2H$ wherein $R_7$ is an aromatic or aliphatic moiety substituted with a $CO_2H$ group, —$R_8SO_3H$ wherein $R_8$ is an aromatic or aliphatic moiety substituted an —$SO_3H$ group $NR_1R_8$ wherein $R_8$ is an aromatic moiety, —C≡N, —Cl, D wherein D is a chromophore as defined above; and $NR_2R_5$ (amino carbohydrate) wherein $R_2$ and $R_5$ are defined above;

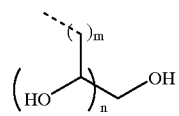

Substructure A

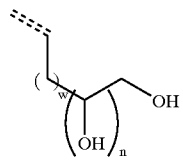

Substructure B

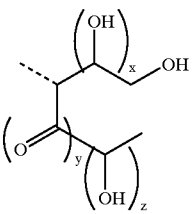

Substructure C wherein
   m is 1–5;
   n is 2–7;
   w is 0–4;
   x is 2–7;
   y is 0–1;
   z is 0–3.

12. A method for inkjet printing according to claim 11 wherein said ink in step II has a pH in the range of from about 7 to about 11 and said $5^{th}$ pen fluid of step I has a pH in the range of from about 3 to about 7.

13. A method for inkjet printing according to claim 11 wherein said reactive agent in said $5^{th}$ pen fluid comprises a salt which reacts with said colorant to form a precipitate.

14. A method for inkjet printing according to claim 13 wherein said salt is selected from the group consisting of divalent salts of chloride, trivalent salts of nitrate, divalent salts of chloride, trivalent salts of chloride, and mixtures thereof.

15. A method for inkjet printing according to claim 11 wherein said reactive agent is selected from the group consisting of organic acids, cationic surfactants, polymeric cationic reagents, and mixtures thereof.

16. A method for inkjet printing comprising the steps of:
   I) underprinting a layer of $5^{th}$ pen fluid comprising a reactive agent onto a substrate; and
   II) printing a layer of an ink comprising a colorant having a structure selected from the group consisting of Formula I, Formula II, Formula III, Formula IV, and mixtures thereof onto said layer of $5^{th}$ pen fluid, wherein:

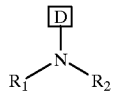

Formula I

Formula II

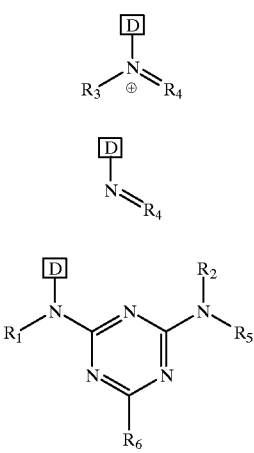

Formula III

Formula IV wherein

D is a chromophore;

$R_1$ is H or $C_1-C_5$;

$R_2$ is a carbohydrate as defined by substructure A;

$R_3$ is $C_1-C_5$;

$R_4$ is a carbohydrate as defined by substructure B;

$R_5$ is defined by substructure C;

$R_6$ is selected from the group consisting of —OH, —$R_7CO_2H$ wherein $R_7$ is an aromatic or aliphatic moiety substituted with a $CO_2H$ group, —$R_8SO_3H$ wherein $R_8$ is an aromatic or aliphatic moiety substituted with an —$SO_3H$ group, $NR_1R_8$ wherein $R_8$ is an aromatic moiety, —C≡N, —Cl, D wherein D is a chromophore as defined above; and $NR_2R_5$ (amino carbohydrate) wherein $R_2$ and R5 are as defined above;

Substructure A

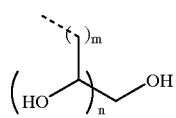

Substructure B

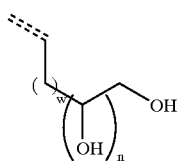

Substructure C wherein m is 1–5;

n is 2–7;

w is 0–4;

x is 2–7;

y is 0–1;

z is 0–3; and

III) overprinting onto said layer of ink a second layer of said $5^{th}$ pen fluid from step I; wherein said ink and said $5^{th}$ pen fluid come into contact and wherein said $5^{th}$ pen fluid comprises a reactive agent which precipitates said colorant.

17. A method for inkjet printing according to claim 16 wherein said ink in has a pH in the range of from about 7 to about 11 and said $5^{th}$ pen fluid of has a pH in the range of from about 3 to about 7.

18. A method for inkjet printing according to claim 16 wherein said reactive agent in said $5^{th}$ pen fluid comprises a salt which reacts with said colorant to form a precipitate.

19. A method for inkjet printing according to claim 18 wherein said salt is selected from the group consisting of divalent salts of chloride, trivalent salts of nitrate, divalent salts of chloride, trivalent salts of chloride, and mixtures thereof.

20. A method for inkjet printing according to claim 16 wherein said reactive agent is selected from the group consisting of organic acids, cationic surfactants, polymeric cationic reagents, and mixtures thereof.

* * * * *

UNITED STATES PATENT AND TRADEMARK OFFICE
CERTIFICATE OF CORRECTION

PATENT NO.   : 6,281,269 B1
DATED         : August 28, 2001
INVENTOR(S)  : David M. Schut et al.

It is certified that error appears in the above-identified patent and that said Letters Patent is hereby corrected as shown below:

<u>Column 21,</u>
Line 35, "colorant" should read -- colorant upon --;

<u>Column 22,</u>
Line 30, "C1" should read -- C1 --.

Signed and Sealed this

Eighteenth Day of March, 2003

JAMES E. ROGAN
*Director of the United States Patent and Trademark Office*